(12) United States Patent
Cernasov (10) Patent No.: US 7,804,624 B2
(45) Date of Patent: Sep. 28, 2010

(54) IMAGE CAPTURE DEVICE (75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 972 days.

(21) Appl. No.: 11/606,130

(22) Filed: Nov. 30, 2006

(65) Prior Publication Data

US 2008/0130069 A1 Jun. 5, 2008

(51) Int. Cl.
*H04N 1/04* (2006.01)
*G02B 26/00* (2006.01)
*G06F 3/12* (2006.01)

(52) U.S. Cl. .................... 358/474; 358/1.1; 359/291

(58) Field of Classification Search .................. 358/474
See application file for complete search history.

(56) References Cited

U.S. PATENT DOCUMENTS

| | | | | |
|---|---|---|---|---|
| 4,837,635 A | * | 6/1989 | Santos | 358/401 |
| 7,012,749 B1 | * | 3/2006 | Mendlovic et al. | 359/560 |
| 7,119,941 B1 | * | 10/2006 | Shabtay et al. | 359/291 |
| 2007/0035803 A1 | * | 2/2007 | Holmes | 359/279 |

* cited by examiner

*Primary Examiner*—Benny Q Tieu
*Assistant Examiner*—Eric A Rust
(74) *Attorney, Agent, or Firm*—Ingrassia Fisher & Lorenz, P.C.

(57) ABSTRACT

A device and method for scanning an image of an object are disclosed. The device includes a controlled transparency film (5) and a set of light detectors (80). A backlight (50) may be used for scanning the object. The controlled transparency film is modulated to apply a series of filters on the backlight as it bounces off the object, back toward the detectors. The light detectors are sampled while each filter is being applied. The resultant measurements correspond to coefficients of a two-dimensional image transform. These coefficients may be collected as a bitstream to be inserted into an image file. This allows the image data to be compressed as it is being captured, thereby reducing processor overhead.

19 Claims, 7 Drawing Sheets

IMAGE CAPTURE DEVICE

FIELD OF THE INVENTION

The present invention relates to devices utilizing controlled transparency to perform image capture.

BACKGROUND OF THE INVENTION

Existing document capture devices generally fall into two categories: camera based (referred to as document cameras) and line scan based (referred to as document scanners).

Document cameras use Charge-Coupled Device (CCD)- or Complementary Metal-Oxide Semiconductor (CMOS)-type image sensors, and the appropriate optics, to take a picture of the document and store the image in memory. From there, the image is compressed and converted to a standard graphics format before being transferred to a local computer. Although document cameras are fast, they are also bulky and expensive. Document cameras also have a relatively low resolution.

Document scanners use a linear array of CCDs (or light-emitting diodes and photodiodes), along with special optics and an electro-mechanical system to capture an image of the document one line at a time. Similar to document cameras, a document scanner performs image compression and conversion to a standard graphics format on the image data after it is captured. Document scanners are less expensive than document cameras, but they are slower and bulkier. Also, the images provided by document scanners are generally of poorer quality than document cameras.

SUMMARY OF THE INVENTION

This invention relates to an image capture device, which uses a controlled transparency layer as a front end processor for applying a two-dimensional image transform on image data as it is initially being captured.

In this document, the terms "image scanning" and "image capture" are used interchangeably. Thus, the use of the term "scanning" does not imply a sequential scanning of the image from top to bottom or from left to right.

In an exemplary embodiment, the controlled transparency layer is logically partitioned into an array of image blocks and, for each image block, there is a light detector situated behind the controlled transparency layer. The image blocks are controlled, in parallel, to run through a sequence of patterns. After each pattern is applied to the image blocks, a backlight is strobed and the light detectors are sampled. Each sampled measurement of a given detector represents a transform coefficient for the corresponding image block. This is because each pattern is designed to filter the incoming light, such that sampled intensity for a given image block represents the amplitude of a particular combination of spatial frequency components.

In a particular exemplary embodiment, the sequence of patterns or filters corresponds to the coefficients of a Direct Cosine Transform (DCT). By establishing the size of each image block as an 8 by 8 block of pixels, the measurements sampled by the light detectors may be inserted into a bitstream that is compliant with the JPEG standard. Thus, by simply adding an appropriate header and optional footer to this bit stream, a JPEG file of the scanned image may be obtained. Alternatively, the sampled measurements may be processed according to a quality matrix, before inserting them into the bitstream, in order to achieve a desired level of compression for the JPEG image.

However, the present invention is not limited to JPEG. According to an alternative embodiment, the invention may be designed to obtain coefficients of another type of two-dimensional image transform, such as Direct Fourier Transform (DFT) or Walsh-Hadamard Transform (WHT).

According to another specific exemplary embodiment, a liquid crystal (LC) layer may be implemented as the controlled transparency layer. The LC layer may be of the same type as those used in conventional liquid crystal display (LCD) devices. Thus, the present invention may be built into an LCD panel capable of functioning as both an image display device (computer monitor, television screen, etc.) as well as an image scanner. For example, one possible application of the invention is to redesign the LCD screen of a laptop computer to incorporate the additional functionality of a document scanner.

Further aspects in the scope of applicability of the present invention will become apparent from the detailed description provided below. However, it should be understood that the detailed description and the specific embodiments therein, while disclosing exemplary embodiments of the invention, are provided for purposes of illustration only.

BRIEF DESCRIPTION OF THE DRAWINGS

A more complete understanding of the present invention will become apparent from the following description taken in conjunction with the accompanying drawings, which are given by way of illustration only and, thus, are not limitative of the present invention. In these drawings, similar elements are referred to using similar reference numbers, wherein.

DETAILED DESCRIPTION OF EXEMPLARY EMBODIMENTS

Exemplary embodiments of the present invention provide a method and device, which utilize a controlled transparency film to scan an image of an object. Particularly, this transparency film is used for applying a two-dimensional image transform on the pixel data, while the pixel data is being captured, in order to increase the speed and reduce the processor overhead required for scanning images in a standard format.

A controlled transparency film is a sheet or layer of material, which may be logically partitioned into pixel elements. The transparency of each pixel element is controllable on the basis of electrical control signals. Various types of existing display devices utilize a layer or sheet of material whose pixel elements have a controllable transparency, which may be implemented as a controlled transparency layer according to the invention. Examples of this include liquid crystal display (LCD) devices, "electronic ink" devices, and display panels that utilize electrophoresis.

The liquid crystal (LC) layer used in various types of existing LCD device are well suited to be implemented as a controlled transparency film. Thus, exemplary embodiments of the invention will be described below in connection with the use of an LC layer. However, it should be noted that an LC layer is but one example of a suitable type of controlled transparency layer. The present invention is not limited to the use of LC layers, and the principles of the invention described below may be applied to image capture devices utilizing other types of controlled transparency films.

Since a particular exemplary embodiment of the invention contemplates the use of an LC layer as the controlled transparency layer, a description will now be provided regarding the operative principles of an LC layer in an exemplary type of LCD device. It should be noted that this description is merely provided for purposes of enablement and is not meant to be limiting on the invention. It should also be noted that the following description merely refers to the operation of a particular type of LCD device and, thus, does not apply to every type of LCD device (or LC layer) currently in use.

Figure 1A:
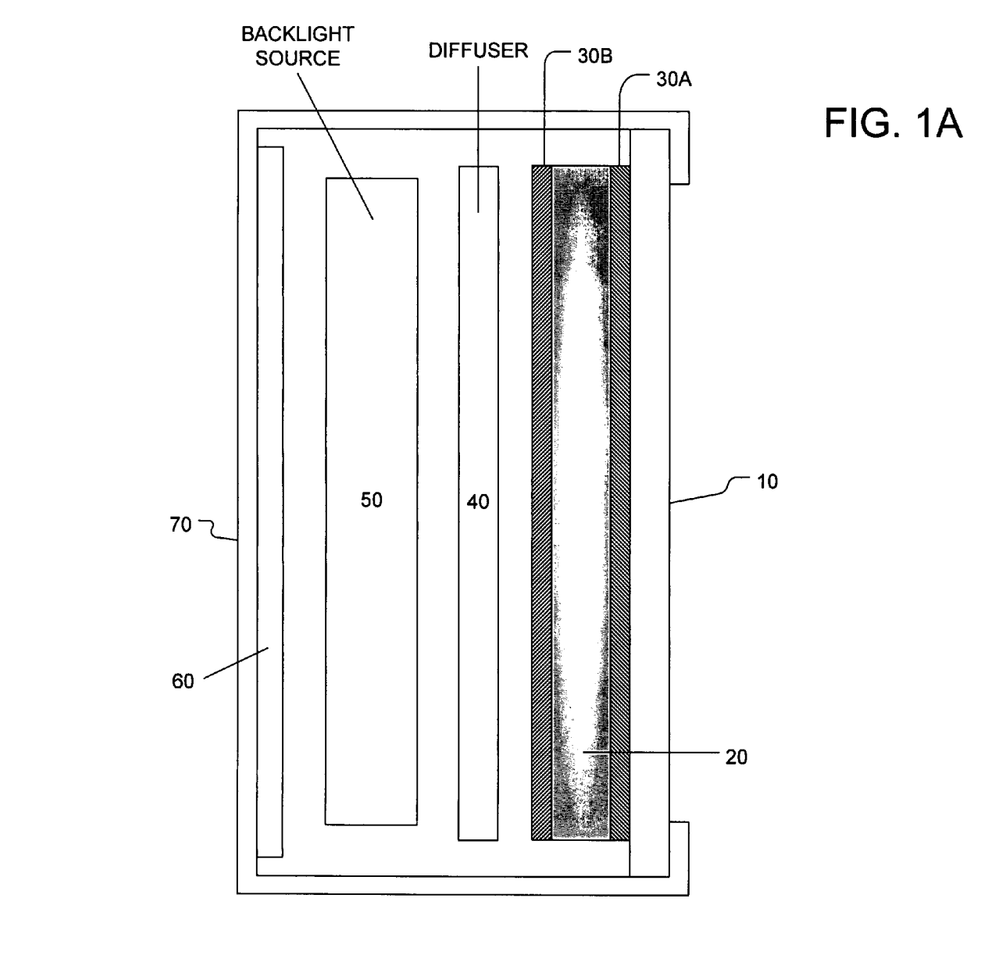
FIGS. 1A and 1B illustrate the configuration of an existing type of display device utilizing a controllable transparency film.
Figure 1B:
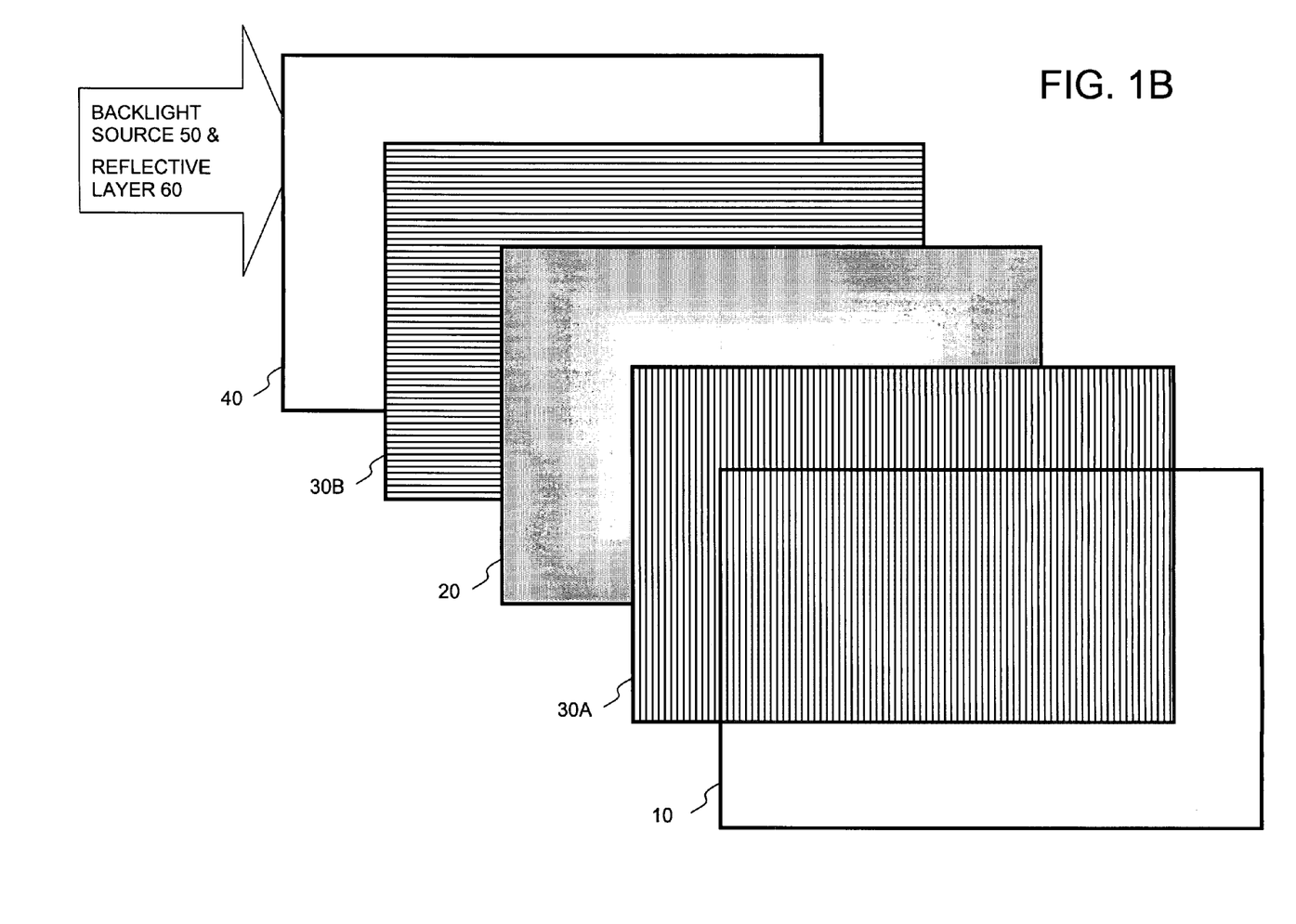

The configuration of a typical backlit LCD device is illustrated in FIGS. 1A and 1B. As shown in FIG. 1A, a typical LCD device includes a liquid crystal (LC) layer 20 sandwiched between two polarizing filters 30A and 30B (hereafter "polarizers"). The LC layer is protected by a transparent front protective sheet 10, e.g., a glass plate. For a backlit LCD device, behind the LC and polarizing layers are a light diffusing film 40 (hereafter "diffuser"), a backlight source 50, and a reflective surface 60. A casing or enclosure 70 is provided to hold the aforementioned layers in place. FIG. 1B illustrates an exploded view of the stack of LCD layers described above. These layers may collectively be referred to as the "LCD stack" of a backlit LCD device.

Although the blacklight source 50 is illustrated as a functional block in FIG. 1A, those of ordinary skill in the art will readily contemplate that various types and arrangements of backlight sources 50 may be used. Light-emitting diodes (LEDs) are increasingly being used as LCD backlights. For example, the backlight source 50 may an LED edge-lit light guide assembly, which includes a series LEDs situated along the perimeter of a light guide (i.e., diffuser plate) and oriented to emit directly into the light guide. Another example of a backlight source 50 is an LED panel, in which a series of LEDs are mounted directly onto the reflective layer 60. Other types of backlight sources 50 are also possible, e.g., cold cathode fluorescent lamps (CCFLs).

Referring again to FIG. 1A, the backlight emits from source 50 to the diffuser 40. The diffuser 40 diffuses this light to make the intensity or brightness more uniform across the LCD. Polarizers 30A and 30B are cross-polarized with respect to each other. Thus, the backlight polarized by polarizer 30B must be rotated to some extent by LC layer 20 in order to pass through polarizer 30A. The degree to which the LC layer 20 rotates the light is dependent upon the amount of voltage applied across the various liquid crystal molecules in the LC layer 20. For instance, a pair of electrodes (not shown) may be positioned across each LC cell to apply an appropriate voltage to "twist" the corresponding LC molecules, thereby rotating the backlight to pass through. In backlit LCD devices, numbers and characters are displayed according to the LC cells that allow light to pass through polarizers 30A and 30B.

According to an exemplary embodiment of the present invention, an image scanning device may utilize such an LC layer 20, as well as other types of controlled transparency films, to perform front end processing on the image data, as it is being captured. In a particular exemplary embodiment using an LC layer 20, the configuration and control of the LC layer 20 may be similar to those in conventional backlit LCD devices, as described above in connection with FIGS. 1A and 1B.

In fact, it is possible to modify the design of existing LCD devices to incorporate image scanning functionality according to the principles of the present invention. Thus, the present invention may be implemented as added functionality in existing LCD applications, e.g., computer monitor, television, other types of display panels. It is contemplated that other types of existing display devices, which utilize a layer or sheet of material with controllable transparency, may also be reconfigured to provide image scanning capability according to the principles described herein.

Figure 2A:
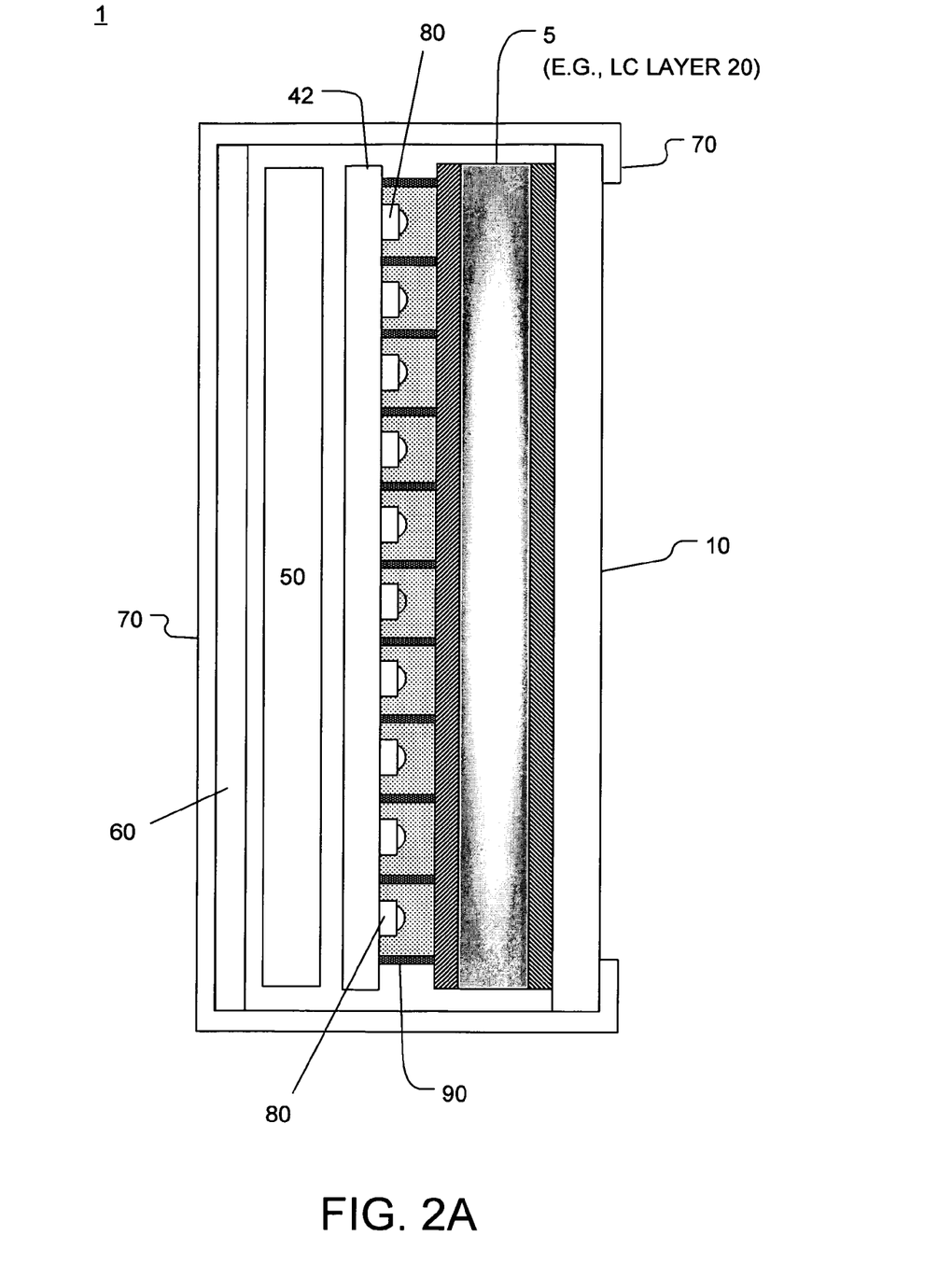
FIGS. 2A and 2B illustrate the configuration of an image scanning device, according to an exemplary embodiment of the present invention.
Figure 2B:
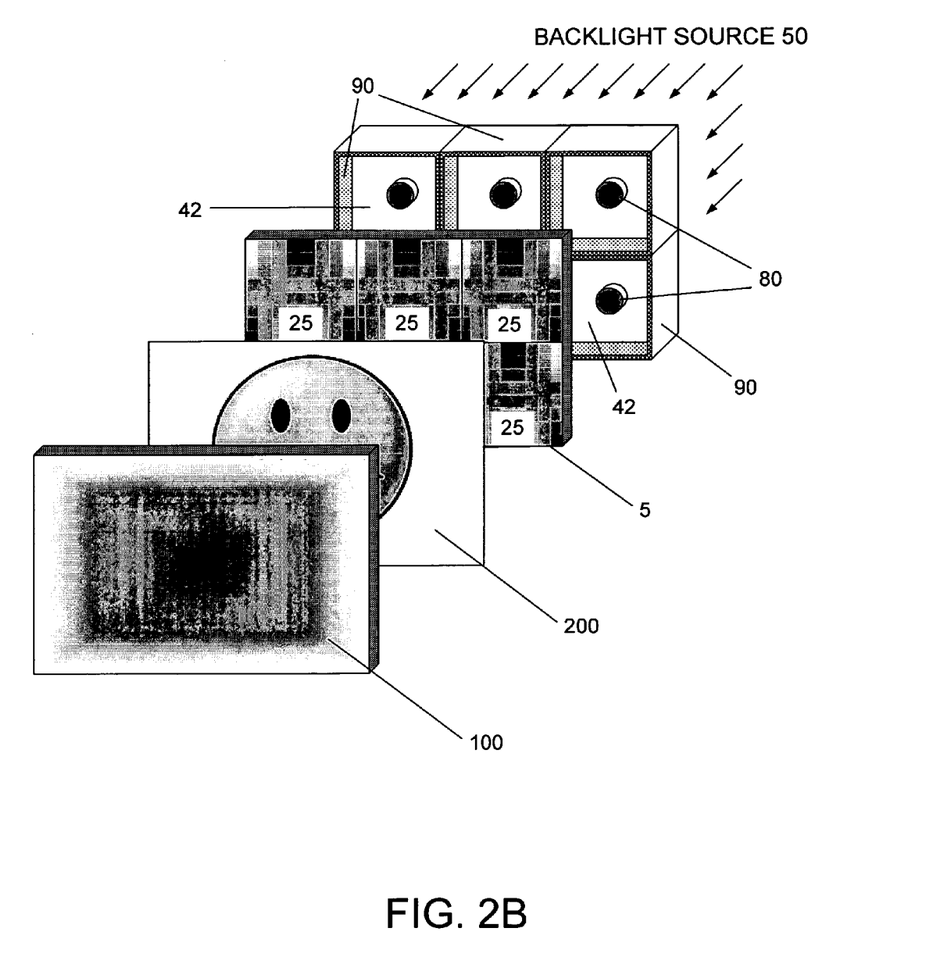

FIGS. 2A and 2B conceptually illustrate the configuration of an image scanning device 1, according to an exemplary embodiment. The purpose of these figures is to describe the functional relationship between various elements illustrated therein, rather than provide a realistic representation of the parts of the device. Thus, these figures are not intended to accurately show the dimensions, shapes, positioning, or number of elements.

FIG. 2A illustrates a cross-section of the device 1. Similar to conventional backlit LCDs, the image scanning device 1 may include a casing 70 enclosing a front protective sheet 10, a controlled transparency film 5 (e.g., an LC layer 20 sandwiched between polarizers 30A and 30B), a backlight source 50 and reflective layer 60. However, FIG. 2A further illustrates an array of light detectors 80 (shown in FIG. 2B as a two-dimensional array). Particularly, these light detectors 80 are mounted to a light diffuser plate 42. Further, the light detectors 80 are separated from each other by opaque walls or partitions 90, also mounted on the diffuser plate 42.

FIG. 2B illustrates an exploded top view of various elements utilized during the image scanning process, according to an exemplary embodiment. Particularly, FIG. 2B illustrates various elements in image scanning device 1 of FIG. 2A, including the controlled transparency film 5 (e.g., LC layer 20), the arrangement of light detectors 80 and opaque partitions 90 mounted onto diffuser plate 42, and the backlight 50. As shown in FIG. 2B, the controlled transparency film 5 may be logically partitioned into image blocks 25, each represent an N-by-N block (N being an integer) of pixels of the scanned image. Each light detector 80 is responsible for capturing image data for a particular image block 25. Thus, opaque partitions 90 may be designed, based on the logical partitions of the controlled transparency film 5, so that each detector's 80 measurements are limited to the N-by-N pixel area of the corresponding image block 25.

Further, FIG. 2B shows that the image scanning device 1 may be used for scanning documents. For instance, FIG. 2B illustrates a document 200 with a picture of a smiley face being scanned. Accordingly, if an LC layer 20 is used, the document 200 may be placed between the LC layer 20 and an additional reflective surface 100. The reflective surface 100 of device 1 may be used to bounce back the light to detectors 80.

Figure 4:
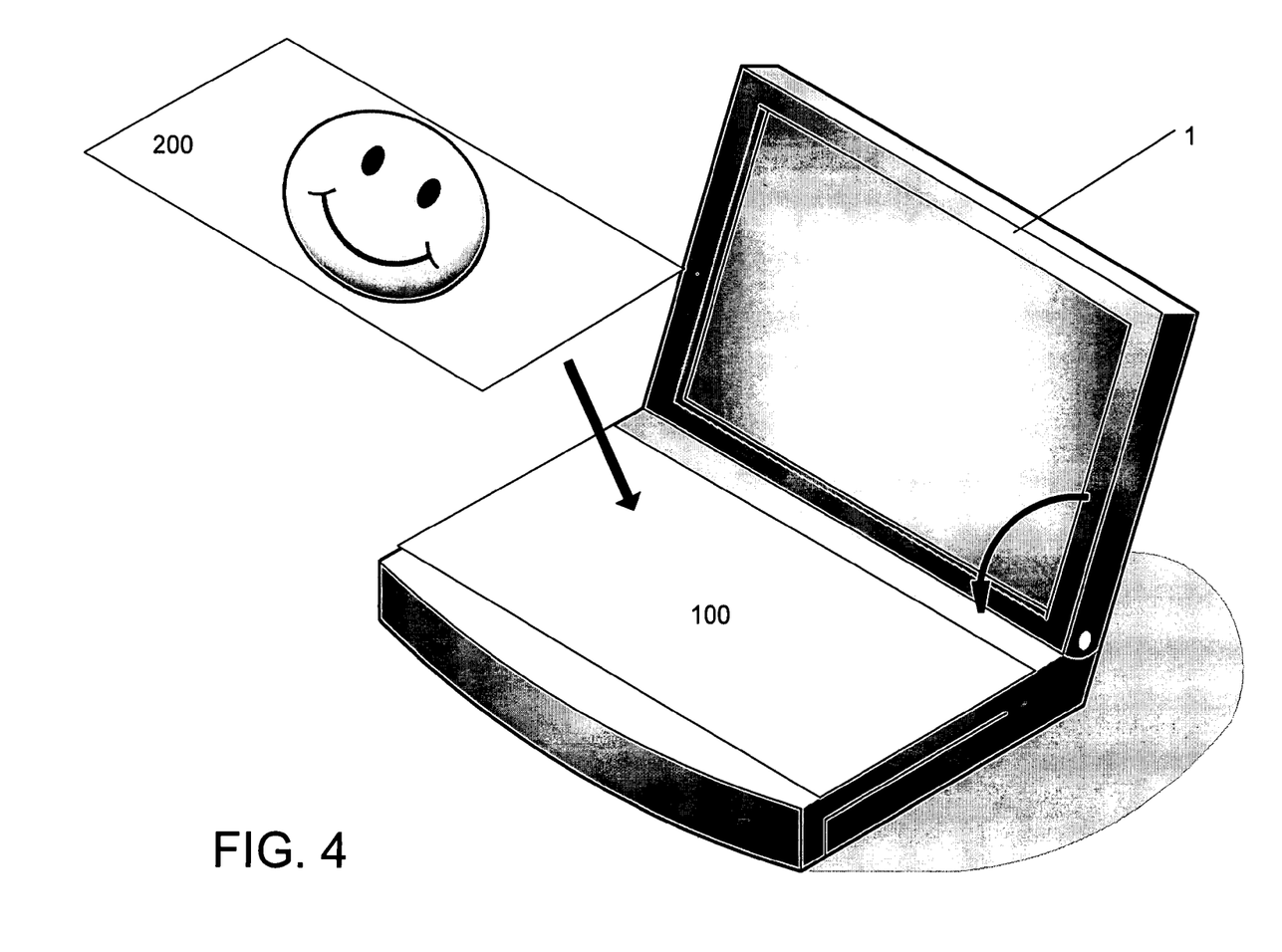
FIG. 4 illustrates a particular application in which a laptop computer is configured with document scanning capability, according to an exemplary embodiment of the present invention.

For example, a specific embodiment of the present invention may be implemented as part of a laptop computer. Such an implementation is illustrated in FIG. 4. Specifically, the image scanning device 1 may dually function as the computer monitor, which is rotatably hinged on the laptop keyboard. The reflective layer 100 may simply be a reflective sheet or film that covers the laptop keyboard while the device 1 operates as a document scanner. During this mode of operation, the document 200 may be placed on top of the reflective sheet 100 and the laptop cover shut so that the device 1 covers the document 200 (as indicated by the arrows). During a second mode of operation, where the device 1 simply operates as the laptop monitor, the cover may be opened and the reflective sheet 100 removed.

However, the present invention is not limited to a document scanner. The image scanning device 1 may be used for scanning other types of objects. For example, the device 1 may be used for scanning an image of the user's fingerprint by placing the user's hand against the LCD screen. This could be used as an alternative to entering a password, in order for the user to log into his computer. The invention could also be used for obtaining other forms of biometric identification for the user, or for scanning the images of other types of objects that can be placed near the LC layer 20.

Next, the operation of the image scanning device 1 illustrated in FIGS. 2A and 2B, will be described. To help explain the operation of device 1, reference will be made to FIG. 5, which is a flowchart illustrating steps in the image scanning process.

Figure 5:
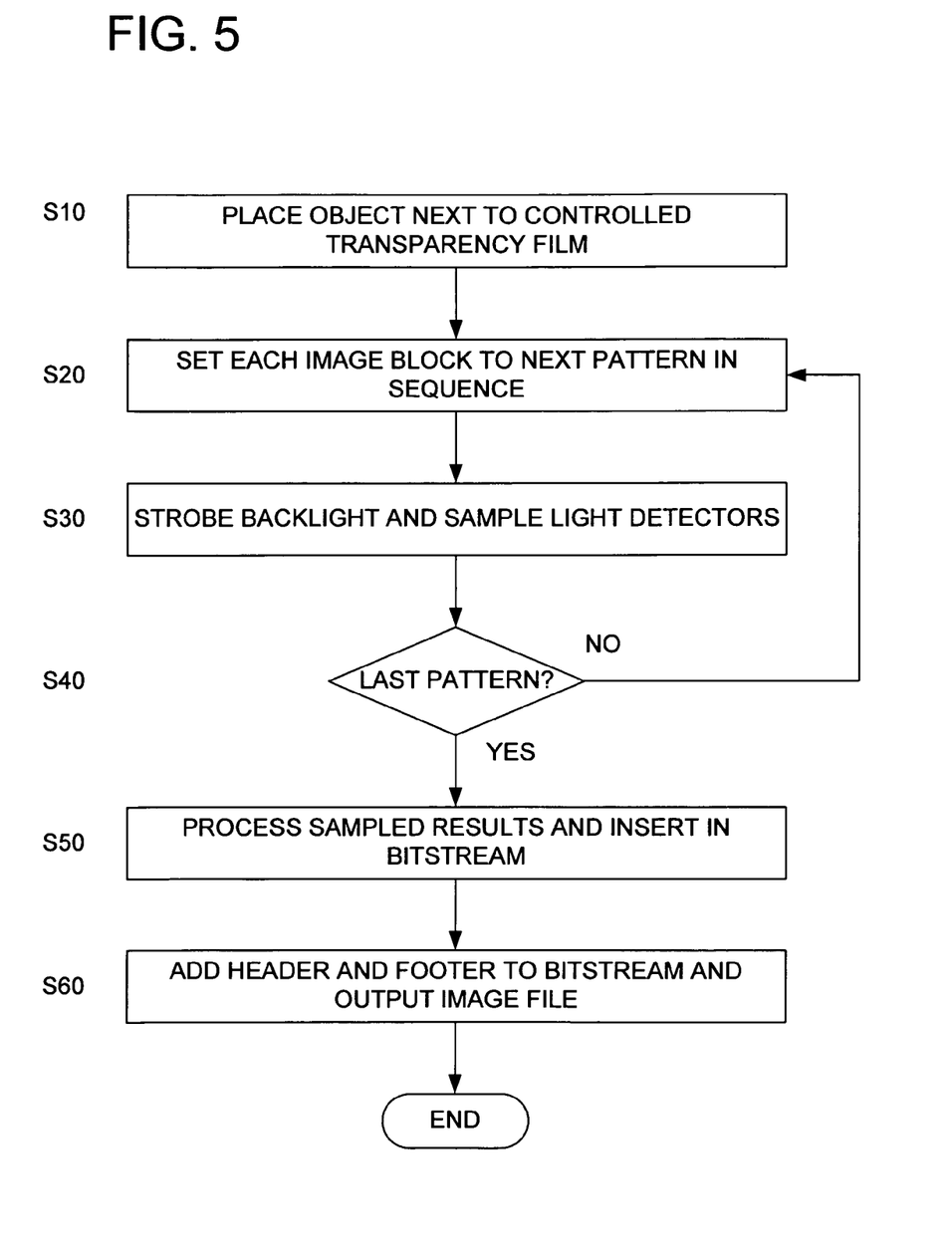
FIG. 5 is a flowchart describing a process for scanning an image of the document, according to an exemplary embodiment of the present invention.

In an exemplary embodiment, the document 200 or object to be scanned is placed next to the controlled transparency film 5 (step S10 of FIG. 5). In the LC layer embodiment discussed above, this may involve placing the document 200 to be scanned between a reflective layer 100 and an LC layer 20 of the device 1. Alternatively, a user may place another type of object (e.g., his hand) at or near the front surface 10 to be scanned.

After the object is placed into position, the image scanning process may begin. According to an exemplary embodiment, each image block 25 in the controlled transparency film 5 is designed to sequentially apply a set of filters on the light passing through to the corresponding light detector 80. This is accomplished by controlling the image blocks 25, in parallel, to run through a series of patterns (step S20 in FIG. 5). After the image blocks 25 are set to a particular pattern, the backlight source 50 is strobed, and the light detectors 80 are sampled (step S30). After the sample measurements are obtained from the detectors 80, the next pattern is applied (step S40)

The filters/patterns will now be described in more detail. To set each image block 25 to a particular pattern, the liquid crystal cells are driven, e.g., by electrodes (not shown) to particular levels of transmissivity. The result is that, as each filter is applied, the controlled transparency film 5 (e.g., LC layer 20) is tiled with the corresponding pattern (where each of the "tiles" corresponds to an image block 25). In an exemplary embodiment, the pattern of each tile is designed according to a particular transform coefficient in a two-dimensional image transform. In other words, each pattern may be designed so that, when an image block 25 is set to that pattern, the intensity of light passing through the image block 25 (and measured by the corresponding detector 80) represents a corresponding transform coefficient.

The image transform may be designed to convert the captured image from its pixel raster format to a format describing the image in terms of its spatial frequency components. Accordingly, each pattern may be designed to filter incoming light intensity so that the filtered signal represents an amplitude of a particular combination of spatial frequency components.

Examples of image transforms that transform image signals from spatial to frequency components include the Discrete Cosine Transform (DCT), the Discrete Fourier Transform (DFT), and the Walsh-Hadamard Transform (WHT). While any of these transforms, as well as other transforms, may be used in the invention, an exemplary embodiment will be described below for applying DCT.

DCT is the transform used in the JPEG standard. JPEG, in turn, is a standard method of compressing photographic images (JPEG stands for Joint Photographic Experts group). In JPEG, the DCT is applied on elementary image areas (i.e., image blocks) of 8 by 8 pixel to compress the image. DCT is applied to each image block according to the following equation:

$$D(i, j) = \frac{1}{4} \frac{C(i)C(j)}{Q(i, j)} \sum_{m=0}^{m=7} \sum_{m=0}^{n=7} p(m, n) \cos\frac{(2m + 1)i\pi}{16} \cos\frac{(2n + 1)i\pi}{16} \quad \text{(Eq. 1)}$$

where $D(i,j)$ is a coefficient value for the image transform of the image block, i is an index of increasingly higher spatial frequency components in the horizontal direction, j is an index of increasingly higher spatial frequency components in the vertical direction, and $Q(i,j)$ are coefficients in a quantization matrix (to be explained in more detail below). Also, $C(i)$ and $C(j)$ coefficients are defined as:

$$C(k) = \begin{cases} \frac{1}{\sqrt{2}} & \text{for } k = 0 \\ 1 & \text{for } k > 0 \end{cases} \quad \text{(Eq. 2)}$$

Figure 3:
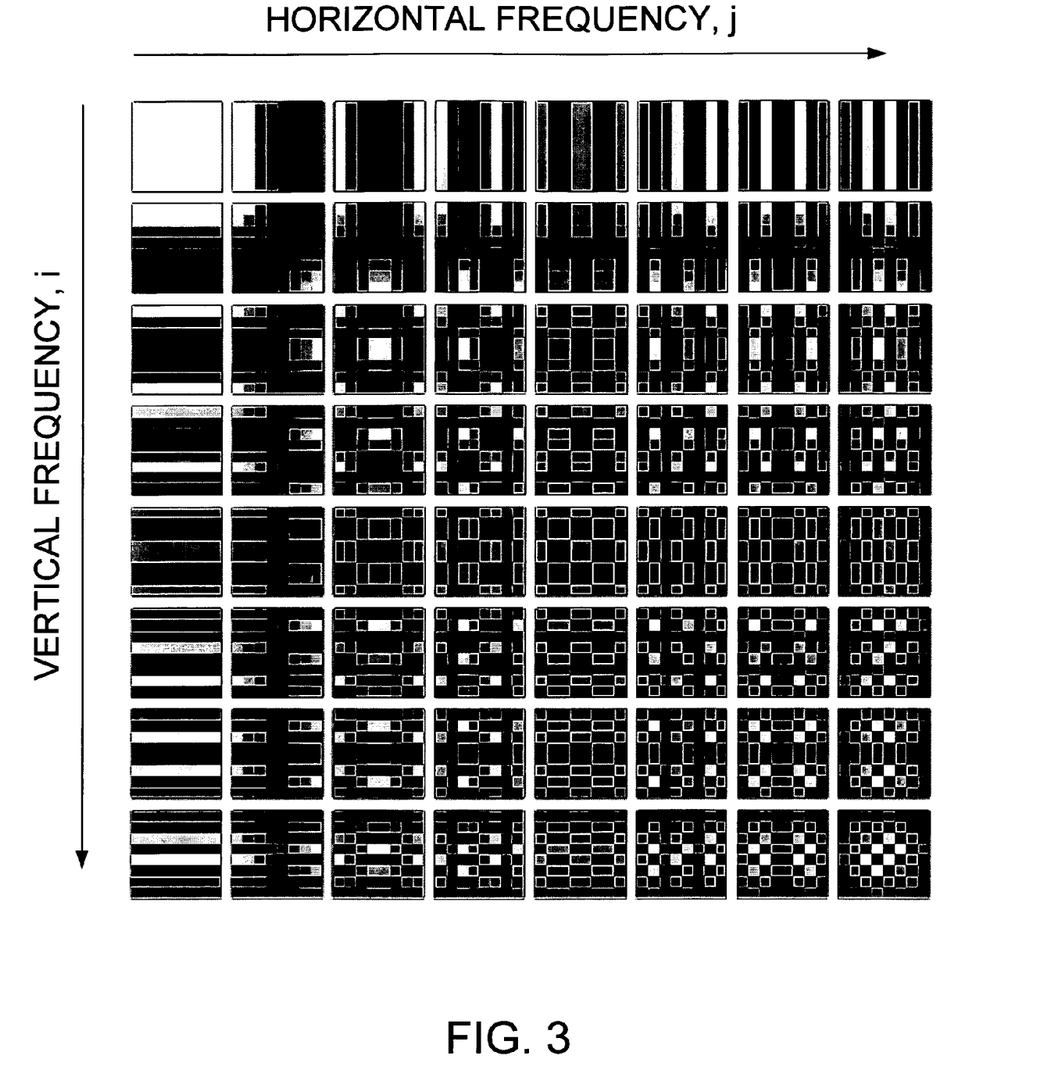
FIG. 3 illustrates a series of patterns corresponding to the Discrete Cosine Transform (DCT), which may be applied, in parallel, to the image blocks of the controlled transparency layer during the scanning process, according to an exemplary embodiment of the present invention.

FIG. 3 illustrates a set of patterns that correspond to the DCT coefficients $D(i,j)$. Modified versions of these patterns may be sequentially applied to the image blocks 25 during the scanning process to obtain the transform coefficients for each image block 25. Each pattern is designed to filter an image signal so that the filtered signal represents an amplitude of a particular frequency component. For instance, going from left to right (i.e., as j increases), the patterns in FIG. 3 go from representing lower to higher frequency components in the horizontal direction. On the other hand, going from top to bottom (i.e., as i increases), the patterns go from representing lower to higher frequency components in the vertical direction.

However, the patterns of FIG. 3 may be modified to compensate for the fact that the scanning light passes through each filter twice before being detected. Particularly, in an exemplary embodiment, after the controlled transparency film 5 is tiled with a particular pattern, the backlight source 50 is strobed. After being diffused by diffuser plate 42, the backlight passes through the image blocks 25 to the scanned object, and bounces off the object back through the respective image blocks 25. The light detectors 80 are sampled in accordance with the strobing of the backlight source 50 to obtain the measurements for the particular pattern. This is illustrated by step S30 in FIG. 5.

Thus, each pattern that is actually applied to the image blocks 25 may be a modified version of the corresponding DCT pattern in FIG. 3. For example, the liquid crystal transmittance values for the image blocks 25 may be determined based on the square root of the actual DCT pattern value.

Each pattern may also be modified according to the particular quantization matrix Q being applied. Particularly, in DCT, the quantization matrix Q determines the balance between image quality and compression in the JPEG image. The quantization matrix coefficients $Q(i,j)$ may be designed to cancel out various high frequency components of the image, to which human eyes are less sensitive. An example of a quantization matrix Q is:

$$Q(i,j) = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix} \quad \text{(Eq. 3)}$$

However, other quantization matrices are possible, depending on the amount of image quality and capture speeds desired.

Other factors may also be taken into account in modifying the transmittance values, e.g., the attenuation of light as it exits the LC layer 20. Also, while the example of DCT is described above, it should be noted that the patterns may be similarly modified when other types of image transforms (e.g., DFT or WHT) are applied.

As discussed above, the controlled transparency film 5 may be controlled according to existing techniques. For instance, if an LC layer 20 is used, it may be controlled using a conventional type of LCD controller (not shown), to cycle through the patterns. If DCT is applied, the patterns of FIG. 3 (or modified versions thereof) may be applied in any particular sequence. However, according to a particular exemplary embodiment, the patterns may be cycled through according to the sequence in which the corresponding DCT coefficients are to be encoded in the JPEG bitstream.

Thus, after the image blocks 25 cycle through the set of patterns, the sampled light measurements may be collected and processed as necessary, so that the resultant data (transform coefficients) may be inserted into a bitstream (step S40 in FIG. 5). The resultant bitstream may be further processed, e.g., run-length coding, zig-zag scanning, and others, may be performed. The image scanning device 1 may include a data processor (not shown) connected to the detectors 80 to perform such data collection and processing. In an exemplary embodiment, after the bitstream is generated, a file header and optional footer may be inserted, as well as other types of file markers, to generate an image file (step S60). For instance, the image scanning device 1 may be capable of outputting JPEG a compliant image file, representing a photograph-quality image of the object thus scanned.

As discussed above, the sampled measurements of the light detectors 80 directly correspond to transform coefficients. Thus, the controlled transparency film 5 operates as a type of front end processor for applying an image transform on the image signals as they are initially being captured. This reduces the amount of processor overhead typically required for compressing and converting the captured image signals to a standard graphics format. It also increases the speed of capture with respect to conventional scanners because of the parallel processing of the pixels. It also decreases storage memory requirements and decreases bandwidth. Also, since the image capture functionality can be implemented within a standard computer monitor environment, it can lower overall system costs.

Exemplary embodiments having been described above, it should be noted that such descriptions are provided for illustration only and, thus, are not meant to limit the present invention as defined by the claims below. Any variations or modifications of these embodiments, which do not depart from the spirit and scope of the present invention, are intended to be included within the scope of the claimed invention.

What is claimed is:

1. A device for scanning an image of an object, comprising:
   a controlled transparency film configured to control the passage of light therethrough, wherein the controlled transparency film is modulated to apply a series of filters on the light passing therethrough;
   a plurality of light detectors configured to measure light passing through the controlled transparency film, wherein the light detectors are sampled in accordance with the application of the filters, such that the samples of measured light represent transform coefficients of the scanned image of the object and
   a backlight source configured to strobe in accordance with the sampling of the light detectors, wherein each backlight strobe passes through the controlled transparency film to the object being scanned, such that a reflection of the strobe by the object passes back through the controlled transparency film to be detected by the detectors.

2. The device of claim 1, wherein the device is configured for dual modes of operation including:
   a first mode of operating as an image scanner, and
   a second mode of operating as an image display device.

3. The device of claim 1, wherein the controlled transparency film is a liquid crystal (LC) layer.

4. The device of claim 3, wherein the device is configured to scan an image of a document, the device further comprising:
   a reflective layer disposed in such a manner that, while the document is being scanned, the document is placed between the LC layer and the reflective layer.

5. The device of claim 4, the device being implemented in a laptop computer, wherein
   the LC layer is part of a monitor rotatably hinged to a keyboard of the laptop computer,
   the reflective layer covers the keyboard and the monitor is shut while the document is being scanned.

6. The device of claim 3, wherein the detectors are mounted to a diffuser plate, such that the backlight strobe is diffused by the diffuser plate before passing through the LC layer to the object being scanned.

7. The device of claim 6, wherein the arrangement of detectors on the diffuser plate is configured so that
   each detector corresponds to a block portion of the LC layer, and
   the detectors are separated from each other by opaque partitions.

8. The device of claim 7, wherein the block portion represents an 8 by 8 pixel image block for the scanned image of the object.

9. The device of claim 1, wherein the series of filters correspond to a two-dimensional image transform, and the device further comprises:
   a processing unit configured to process the samples of measured light to generate a bit stream to be incorporated in an image file representing the scanned image of the object.

10. The device of claim 9, wherein
    the two-dimensional image transform is Discrete Cosine Transform, and
    the image file complies with the JPEG standard.

11. A method for utilizing a controlled transparency film to scan an image of an object, comprising:
    logically partitioning the controlled transparency film into image blocks;

modulating each image block of the controlled transparency film to apply a series of filters on light passing therethrough;

measuring the filtered light passing through each image block such that a sample of the measured light is obtained for each applied filter, each sample representing a transform coefficient of the scanned image of the object, and strobing a backlight source in accordance with the sampling of measured light, wherein each backlight strobe passes through the controlled transparency film to the object being scanned, and a reflection of the strobe by the object is detected during each sampling interval.

12. The method of claim 11, wherein a liquid crystal (LC) layer in a liquid crystal display (LCD) device is used as the controlled transparency film.

13. The method of claim 12, wherein the object being scanned is a document, the document being disposed between the LC layer and a reflective layer.

14. The method of claim 12, further comprising:
mounting light detectors to a diffuser plate such that each light detector corresponds to an image block of the LC layer wherein the backlight strobe is diffused by the diffuser plate before passing through the LC layer to the object being scanned.

15. The method of claim 14, further comprising:
separating the light detectors from each other with opaque partitions.

16. The method of claim 11, wherein the series of filters correspond to a two-dimensional image transform, and the method further comprises:
processing the samples of measured light to generate a bit stream to be incorporated in an image file.

17. The method of claim 16, wherein
each image block corresponds to an 8 by 8 pixel area of the scanned image of the object,
the two-dimensional image transform is Discrete Cosine Transform, and
the image file complies with the JPEG standard.

18. The method of claim 17, wherein the processing includes:
obtaining the transform coefficients represented by the samples of measured light;
processing the transform coefficients according to a quantization matrix, the quantization matrix corresponding to a level of compression for the image file.

19. The method of claim 16, wherein the two-dimensional image transform is such that each transform coefficient represents an amplitude of a frequency component of the scanned image of the object.

* * * * *